US012518560B1

(12) United States Patent
Gupta et al.

(10) Patent No.: US 12,518,560 B1
(45) Date of Patent: Jan. 6, 2026

(54) SEARCHABILITY AND DISCOVERABILITY OF CONTEXTUALLY RELEVANT FRAMES WITHIN DIGITAL CONTENT

(71) Applicant: Amazon Technologies, Inc., Seattle, WA (US)

(72) Inventors: Honey Gupta, Patna (IN); Prabhakar Gupta, Delhi (IN); Dongqing Zhang, Kirkland, WA (US); Shixing Chen, Seattle, WA (US); Xiaohan Nie, Lynnwood, WA (US); Muhammad Raffay Hamid, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 1021 days.

(21) Appl. No.: 17/474,692

(22) Filed: Sep. 14, 2021

(51) Int. Cl.
 G06V 40/16 (2022.01)
 G06N 3/045 (2023.01)
 G06V 20/40 (2022.01)
 H04N 19/172 (2014.01)

(52) U.S. Cl.
 CPC ........... *G06V 40/169* (2022.01); *G06N 3/045* (2023.01); *G06V 20/49* (2022.01); *H04N 19/172* (2014.11); *G06V 2201/07* (2022.01)

(58) Field of Classification Search
 CPC .. G06V 40/169; G06V 20/49; G06V 2201/07; G06N 3/045; H04N 19/172
 See application file for complete search history.

(56) References Cited

U.S. PATENT DOCUMENTS

| | | | |
|---|---|---|---|
| 9,836,641 B2* | 12/2017 | Philbin | G06F 18/24 |
| 2009/0208106 A1* | 8/2009 | Dunlop | G06V 20/10 |
| | | | 382/173 |
| 2010/0177891 A1* | 7/2010 | Keidar | G06F 21/60 |
| | | | 375/E7.026 |
| 2012/0109858 A1* | 5/2012 | Makadia | G06F 16/434 |
| | | | 707/E17.014 |
| 2014/0250109 A1* | 9/2014 | Wang | G06F 16/583 |
| | | | 707/723 |
| 2017/0286522 A1* | 10/2017 | Hohwald | G06F 16/438 |
| 2018/0232843 A1* | 8/2018 | Kim | H04N 19/114 |
| 2019/0005313 A1* | 1/2019 | Vemulapalli | G06V 10/454 |
| 2019/0073520 A1* | 3/2019 | Ayyar | G06V 40/172 |
| 2020/0250537 A1* | 8/2020 | Li | G06N 3/084 |
| 2021/0390315 A1* | 12/2021 | Behrostaghi | G06V 20/47 |
| 2022/0012297 A1* | 1/2022 | Basu | G06N 3/02 |
| 2022/0093101 A1* | 3/2022 | Krishnan | G06V 40/20 |
| 2022/0138231 A1* | 5/2022 | Misiewicz | G06N 3/045 |
| | | | 707/722 |

(Continued)

*Primary Examiner* — Solomon G Bezuayehu
(74) *Attorney, Agent, or Firm* — Eversheds Sutherland (US) LLP

(57) ABSTRACT

Systems, devices, and methods are provided for searchability and discoverability of contextually relevant frames within digital content. Digital content, such as videos, may be segmented to identify a plurality of shots. Discoverability may be performed by identifying key frames of the digital content and using a contrastive language-image pre-training (CLIP) model to determine contextual relevance of a frame or shot to textual information associated with the digital content. Searchability may be performed by receiving search parameters and applying various filters to digital content to identify frames or shots that satisfy a user's search query.

16 Claims, 7 Drawing Sheets

(56) References Cited

U.S. PATENT DOCUMENTS

| | | | |
|---|---|---|---|
| 2022/0138247 A1* | 5/2022 | Kotov | G06F 16/532 |
| | | | 707/728 |
| 2022/0230061 A1* | 7/2022 | Singh | G06F 40/20 |
| 2022/0237917 A1* | 7/2022 | Wu | G06N 3/08 |
| 2023/0007365 A1* | 1/2023 | Farre Guiu | G06V 20/41 |
| 2023/0040513 A1* | 2/2023 | Ryan | G06V 20/52 |
| 2023/0054572 A1* | 2/2023 | Shandilya | G11B 27/34 |
| 2023/0223136 A1* | 7/2023 | Goossen | G16H 30/40 |
| | | | 705/2 |

* cited by examiner

SEARCHABILITY AND DISCOVERABILITY OF CONTEXTUALLY RELEVANT FRAMES WITHIN DIGITAL CONTENT

BACKGROUND

For various types of digital content, images or clips of video content may be needed. Images or clips may be shown as preview images or clips, for example, in a menu or list, to provide viewers with preview or general idea of the digital content. For example, an image of a car chase scene may be an appropriate thumbnail or preview image for an action-packed movie. However, the selection of images or clips that are representative of digital content is a difficult and time-consuming task. For example, in many cases, an individual may be required to review digital content that is several hours long to identify a single preview image.

Figure 1:
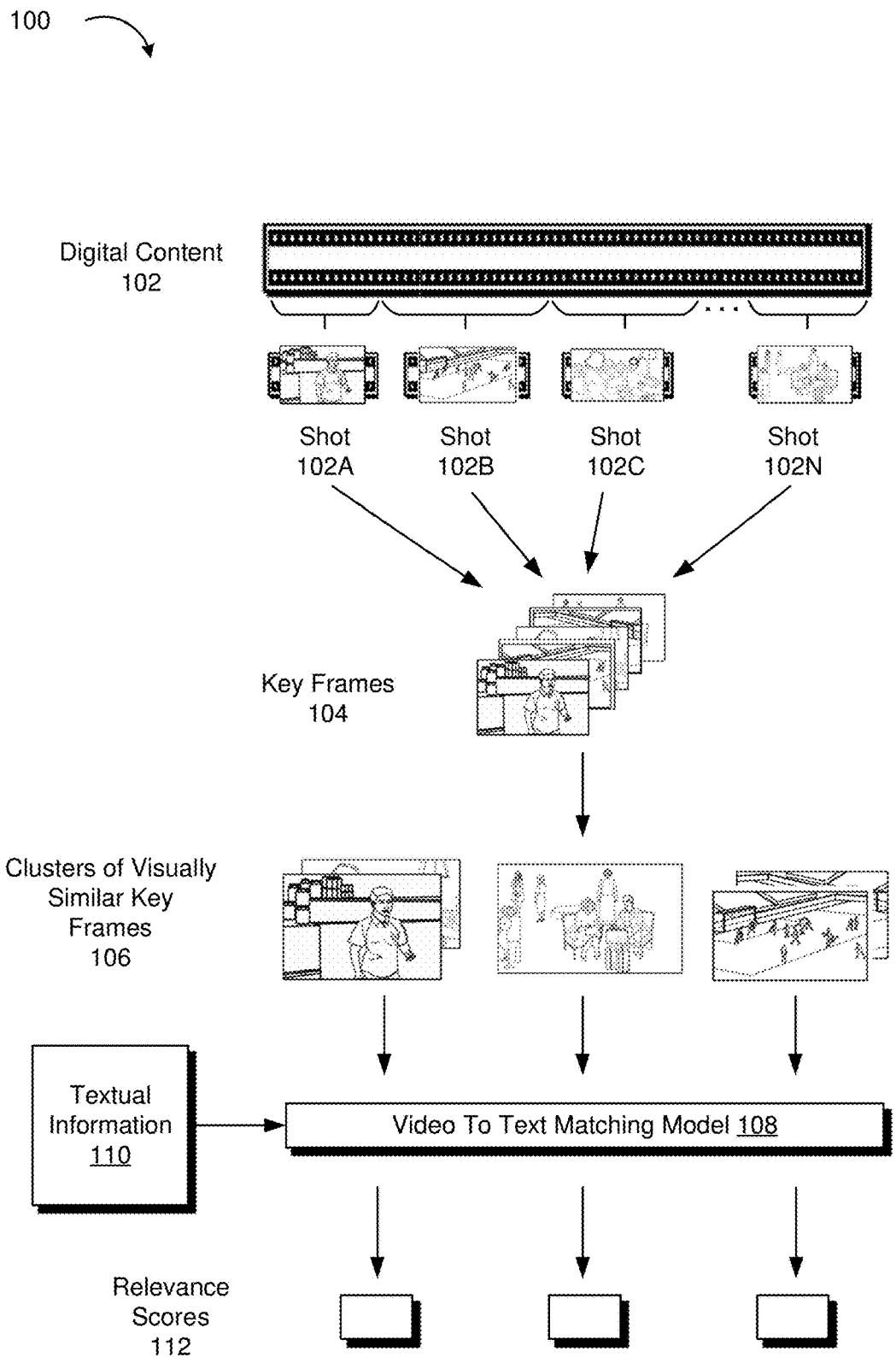
FIG. 1 illustrates a computing environment for discovery of contextually relevant frames of digital content, in accordance with one or more example embodiments of the present disclosure.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers in the figures refer to like elements throughout. Hence, if a feature is used across several drawings, the number used to identify the feature in the drawing where the feature first appeared will be used in later drawings.

DETAILED DESCRIPTION

Techniques described herein may relate to searchability and discoverability of digital content based on contextual information. Contextual information may relate to the contents of digital content, such as its theme, genre, category, and so forth. Digital content discoverability may be utilized by users to quickly find, filter, and review contextually relevant frames of the digital content without requiring the user to have knowledge regarding the substance of the digital content. For example, and according to at least one embodiment, a user provides multimedia content (e.g., a video) to a discoverability subsystem and the discoverability subsystem analyzes the video to identify a collection of contextually relevant frames based on the contents of the multimedia content. For example, for an action movie, a discoverability subsystem may return a collection of frames related to car chases, explosions, and other action-packed scenes. A user may review discoverability results for appropriate frames that may be used to generate preview images, cover art, and other digital assets. For example, when digital content is released or otherwise made available on a multimedia streaming service, preview images, preview videos, and so forth may be generated at scale using discoverability techniques described herein.

Digital content searchability may be utilized by a user in cases where the user wishes to perform a search on digital content for frames that relate to specific contextual information provided by the user. For example, a user that has viewed multimedia content (e.g., a video) or has knowledge regarding contextual information regarding the substance of the content may know that the content is an action movie and provide an action-based search for frames relating to car chase scenes, scenes with a headline actor, scenes with a headline actor and co-actor, and so forth. A searchability subsystem may parse through digital content to identify suitable frames that meet the user's search parameters and provide search results that the user may use to generate preview images, cover art, and other digital assets. For example, when digital content is released or otherwise made available on a multimedia streaming service, preview images, preview videos, and so forth may be generated at scale using searchability techniques described herein.

Discoverability may be implemented according to the following approach, in at least one embodiment: a multimedia source (e.g., an illustrative example of digital content) is received by a discoverability subsystem. The multimedia source may be parsed and organized into a plurality of shots. Shots may refer to a sequence of frames that are shot from a particular perspective, viewpoint, angle, and so forth. A scene may comprise shots from multiple angles, viewpoints, etc. A multimedia source may be segmented into a plurality of shots using a shot-detection solution such as PySceneDetect.

In various embodiments, each shot of a plurality of shots is analyzed. A shot may be analyzed to obtain a key frame representative of the shot. The key frame may be determined based on various criteria. For example, a key frame may be selected from a plurality of frames of a shot by computing the magnitude of frame difference (FD) for each consecutive frames. Selecting the frame with min (FD) is an illustrative example of one way in which the key frame for a shot may be selected, and other suitable techniques may be used, as described below in greater detail.

Key frames may be subject to filtering criteria that are used to ensure key frames are visually suitable for use in the generation of cover art and derivative content. For example, for a filtering routine may be used to ensure that a key frame that is selected is not subject to excessive blurring. In at least one embodiment, frames are analyzed using the variance of the Laplacian (VOL) or Laplacian variance. For scene-based frames, the VOL may be computed for the entire frame, whereas for frames that prominently display faces, the VOL may be computed based on the portion of the frame with the face. For face-based frames, it may be acceptable for the background to be blurred if the face is in focus and not blurry. In some embodiments, filter metrics exclude images that are very bright or very dark, with too much illumination or too little, and so forth. Candidate key frames may be referred to as key frames from shots that are selected and satisfy various quality metrics such as those described above (e.g., blurriness criteria, illumination criteria).

Duplicate images may be removed by extracting image embeddings from key frames using a ResNet-50 model, according to at least one embodiment. Images may be resized to a predetermined size specified by the deduplication model being used. For example, for a ResNet-50 model, candidate key frames may be re-scaled to be 224×224 and provided as inputs to the ResNet-50 model. In various embodiments, the last layer of ResNet-50 backbone model outputs embedding vectors. The embedding vectors candidate frames may be grouped according to a suitable clustering algorithm—for example, using a k-nearest neighbor classification model. In this way, and according to at least one embodiment, visually similar candidate frames from across multiple shots may be clustered and grouped together. Visual similarity may be based on various factors, such as whether large faces in frames have similar distinguishing features such as eye color, hair color, and so forth (e.g., facial similarity), such as whether two scenes depict a similar angles and/or number of persons (e.g., scenic similarity), and so forth.

For each cluster, a relevance score relating how contextually relevant the frames in the cluster are may be computed to determine how similar the candidate key frames of the clusters are to the topic or substance of the digital content as a whole. In at least one embodiment, relevance scores are computed between the image and an input query. A pre-trained contrastive language-image pre-training (CLIP) model may be used to calculate a relevance score relating how contextually relevant the textual information is in relation to the visual information. Textual information may refer to a synopsis or description of the digital content that may be made available to the discoverability subsystem. In at least one embodiment, a CLIP model comprises a text encoder and an image encode that determines the contextual similarity between an input image and an input text.

In various embodiments, relevance scores are generated for each candidate key frame of a cluster and averaged together to determine an aggregate relevance score for the cluster as a whole. Clusters' aggregate relevance scores may be tabulated and presented in an ordered list (e.g., in descending order) so as to provide the user with the most similar clusters of images first, followed by less similar images later. Accordingly, discoverability search results may be generated and presented to a user. As discussed above, the images may be of a high quality and suitable for use as cover art images, preview images, and other derivative content that is related to the substance of the digital content.

Searchability may be implemented according to the following approach, in at least one embodiment: a user may provide a search string, metadata, or other parameters that indicate contextual information to search for in a multimedia source. For example, a user may specify search parameters to find images of a close-up of an actor's face, images that include two actors together in the same frame, images or shots of certain actions (e.g., a car chase, a wedding, and so forth), images of a landmark, and so forth. The user may submit the search parameters based on some knowledge that the user has regarding the digital content. For example, if the user has previously viewed the multimedia source, knows what category or genre the digital content generally falls under, has read reviews of the multimedia, and so forth. The multimedia source may be parsed and organized into a plurality of shots. Shots may refer to a sequence of frames that are shot from a particular perspective, viewpoint, angle, and so forth. A scene may comprise shots from multiple angles, viewpoints, etc. A multimedia source may be segmented into a plurality of shots using a shot-detection solution such as PySceneDetect.

In at least one embodiment, for each shot, text-based search parameters are matched with each shot using a pre-trained video to text relevance model by determining an embedding vector the text-based search parameters and an aligned embedding vector the each shot. Video to text relevance models may be implemented according to techniques described in "End-to-End Learning of Visual Representations from Uncurated Instructional Videos," which is hereby incorporated by reference. For example, the similarity between text-based search parameters and a shot may be determined by computing a cosine similarity score between the respective embedding vectors for the textual information and video-based shot. A relevance score may be determined for some or all shots to identify sequences of action that match a user's search parameters. For example, a user can indicate, in search parameters, to search for shots or images with a "car chase", "wedding", and so forth. The relevance score for some or all shots may be computed in the manner described above.

In various embodiments, key frames are selected from some or all shots. For example, in some cases, shots are filtered based on their relevance scores so that shots with low relevance scores (e.g., below a predetermined threshold) are discarded and not included in any downstream analysis. Key frames may be determined for shots (e.g., the best matching shots) and the key frames may represent each shot using the Laplacian variance.

In some embodiments, search parameters provided by the user indicate that general frame emotion is relevant to the search. For example, a user may search for "heartfelt" or "sad" scenes, which may be conveyed through various contextual information that may be gleaned through shots, such as the general emotion conveyed by the facial expressions or arrangement of characters, through music corresponding to the scene, and other information that may be available. For each character face (e.g., those with sufficient fidelity or clarity), a pre-trained emotion classifier model may be used to determine confidence scores or probabilities for emotions. Average of all probabilities across faces may be used to compute an aggregate frame emotion score or probability.

In some embodiments, search parameters may include a list of one or more characters to find. For example, a user may include search parameters to find shots or frames with various identities (the two leading co-actors for a movie). A facial recognition model may be used to analyze the faces and filter out frames that do not meet the search criteria. For example, search parameters may specify a search for frames with two out of the three main characters of a show.

For identifying the frames with easily recognizable places, a user may provide input search parameters specifying to find frames or shots or scenes of a recognizable landmark, such as the Eiffel Tower, Tokyo, and so forth. A classification model may be used to analyze each frame with recognizable landmarks to match the user request. For example, the user may search for "London Bridge" and frames may be filtered or analyzed to identify specific frames or shots that have London Bridge in the foreground, background, etc.

Search results may be clustered, aggregated, ranked based on similarity or relevance, and returned to the user. For example, if a user searches for two of three main characters (e.g., A, B, and C), then the search results may be grouped according to a first set of frames with {A, B}. a second set of frames with {B, C}, a third set of frames with {A, C}, and fourth set of frames with all three main characters.

The above descriptions are for purposes of illustration and are not meant to be limiting. Numerous other examples, configurations, processes, etc., may exist, some of which are described in greater detail below. Example embodiments will now be described with reference to the accompanying figures.

FIG. 1 illustrates a computing environment 100 for discovery of contextually relevant frames of digital content, in accordance with one or more example embodiments of the present disclosure. Techniques described in connection with FIG. 1 may be implemented in connection with FIG. 7, for example, using a discoverability subsystem.

In at least one embodiment, digital content 102 refers to a video or other multimedia content with visual and/or audio components. Digital content may refer to a file or continuous stream of multimedia content comprising image frames. Frames may be continuously displayed (e.g., at a rate of over 20 image frames per second). Digital content 102 may be any suitable resolution, bitrate, encoding format, etc. Examples of digital content 102 include television shows, movies, advertisements, portions thereof, combinations thereof, and so forth.

In at least one embodiment, digital content 102 may be conceptually organized into smaller units. For example, the smallest unit of measure for digital content 102 may be an individual frame. Individual frames may refer to a still frame or image of a video and appears as a static image. When multiple frames are played together (e.g., at a fixed rate of over 20 frames per second) a user may perceive a motion picture or video. In various embodiments, digital content 102 is selected by a user (not depicted in FIG. 1) as part of a discoverability request A logical sequence of frames may be referred to as a shot. A shot may be conceptually viewed as a portion of a video that is shot from a particular perspective, viewpoint, or angle. A shot may nevertheless convey motion and is not required to be in a static positon—for example, a steadycam may be used to create a shot in which a video camera follows an identity (e.g., actor) up a set of stairs. A shot may comprise a plurality of frames.

Other units of measure may be used to organize digital content 102. For example, a plurality of frames may comprise a shot; a plurality of shots may comprise a scene; a plurality of scenes may comprise a sequence, and so forth. Various units of measure may be used to divide digital content 102 into contiguous portions. As illustrated in FIG. 1, digital content 102 may be organized into a plurality of shots, such as shot 102A, shot 102B, shot 102C, and so forth. In at least one embodiment, digital content 102 is segmented into shots 102A-N. Shots 102A-N may be non-overlapping segments of digital content 102.

Various techniques may be used to segment digital content 102 and identify shots 102A-N. In at least one embodiment, a first machine-learning model is used to analyze digital content 102 and determine a plurality of segments. In at least one embodiment, a scene detection algorithm receives digital content 102 as an input and segments digital content 102 into one or more shots wherein the output of PySceneDetect indicates or is otherwise usable to determine when a respective shot starts and ends. In at least one embodiment, PySceneDetect is used to segment the entirety of digital content 102.

A shot typically includes a temporal sequence of frames that relate to the same content or substance. For example, a shot may be a short sequence of frames that follows an identity (e.g., actor) up a set of stairs. In at least one embodiment, key frames 104 are extracted from shots 102A-N. A key frame may be selected using various techniques, such as those described in connection with FIG. 2. In various embodiments, each shot is parsed and analyzed to extract one key frame. Accordingly, key frames 104 may comprise a plurality of frames, there being one frame per shot in the plurality of frames. Key frames may be selected as having sufficient visual quality. Visual quality may be measured in various ways. For example, frames that have excessive blurring (e.g., a fast-moving car chase) may be of poor visual quality as objects in such frames may be difficult to see. According to at least one embodiment, each frame of a shot is analyzed to determine a quality score, such as a naturalness image quality evaluator (NIQE) score, the NIQE scores of all frames of the shot are ordered to form an ordered list of candidate frames, and the candidate frames are selected one at a time to determine whether they meet a set of visual quality metrics. For example, a visual quality metric may involve computing a Laplacian variance of a candidate frame to determine whether it is subject to excessive blurring. If the candidate frame or a relevant portion thereof is too blurry, it may be discarded and the candidate frame with the next highest NIQE score may be analyzed to determine if it satisfies the visual quality metrics. This process may be repeated until a candidate frame satisfies the visual quality metrics or until all frames of a shot have been exhausted.

Once key frame 104 have been extracted from each shot, clusters of visually similar key frames 106 may be determined. According to at least one embodiment, each key frame is analyzed by one or more convolutional neural networks to determine a respective embedding vector. The embedding vector may comprise a list of values that numerically encode the similarity between various images. For example, if the distance between a first embedding vector of a first image and a second embedding vector of a second image is closer than the distance between the first embedding vector and a third embedding vector of a third image, then the first image is more visually similar to the second image than the third image. Embedding vectors of frames may be classified using a k-means based clustering algorithm into a predetermined number of clusters. Clusters may represent groups of key frames that are visually similar based on the embeddings extracted from them. For example, close-up images of an identity (e.g., main actor) may be shown across multiple shots throughout a movie, and those frames may be grouped together based on visual similarities based on the identity's facial features (e.g., actor's facial features).

In at least one embodiment, the clusters of visually similar key frames 106 are analyzed using a machine-learning model. In at least one embodiment, CLIP model 108 is an example of a type of neural network that is trained to learn visual concepts from natural language processing. In at least one embodiment, CLIP model 108 receives, as inputs, textual information 110 such as a text-based description, summary, or synopsis of digital content 102. The textual information 110 may be generated in any suitable manner, and may be provided, for example, by the creator of digital content 102 or an individual in the media industry tasked with creating such textual information 110. In at least one embodiment, a system iterates through each cluster of visually similar key frames to generate relevance scores 112. For example, a system may obtain a first cluster of visually similar key frames comprising a first plurality of key frames, generate a first sub-score using textual information 110 and a first key frame of the first plurality using CLIP model 108, generate a second sub-score using textual information 110 and a second key frame of the first plurality using CLIP model 108, etc., until sub-scores are generated for some or all key frames of the first plurality, and then generate an aggregate relevance score for the entire first group by averaging the sub-scores of each key frame in the group. This may be repeated for each cluster of the clusters of visually similar key frames 106 to generate a relevance score for each cluster. Visual similarity may be based on various factors, such as whether large faces in frames have similar distinguishing features such as eye color, hair color, and so forth (e.g., facial similarity), such as whether two scenes depict a similar angles and/or number of persons (e.g., scenic similarity), and so forth Relevance scores 112 may be compiled into a list, ordered, and then presented to a user. For example, results corresponding to clusters that are most relevant may be shown first. In some embodiments, clusters that do not exceed a predetermined threshold score may be discarded and not presented in discoverability results. In some embodiments, the top 5, 10, 25, 50, etc. clusters may be provided in discoverability results based on their relevance scores.

Users may receive discoverability results in various ways. For example, in at least one embodiment, the discoverability results are presented to a user in a graphical user interface as a list or grid of ordered results. Results may be ordered by relevance score, grouped by category, and so forth. For example, a user may be presented with the discoverability results visually as a list of thumbnails. The thumbnail image for a cluster may be selected in any suitable manner. As a first example, a thumbnail image for a cluster may be selected as the image in the cluster with the highest sub-score. As a second example, a thumbnail image for a cluster may be selected by computing the centroid for the cluster and selecting the key frame that corresponds to the embedding vector that is closest to the centroid of the cluster. As a third example, a thumbnail image for a cluster may be selected as the key frame that appears earliest in digital content 102. These examples should be understood to be illustrative and non-limiting in nature.

Discoverability results may provide for additional discoverability of digital content 102. For example, a user may be able to click into the thumbnail of a cluster to see additional images of the cluster and select an image of the cluster that is most appropriate for generating clip art, preview image, and so forth. In some embodiments, a user is able to act on the key frames to fast forward to or otherwise locate the specific shot that a key frame was extracted from. Users may use this to quickly review a shot and/or adjacent/related shots to determine how representative a particular shot is to digital content 102 as a whole and more efficiently select images to be used as preview images, cover art, and other digital assets.

Figure 2:
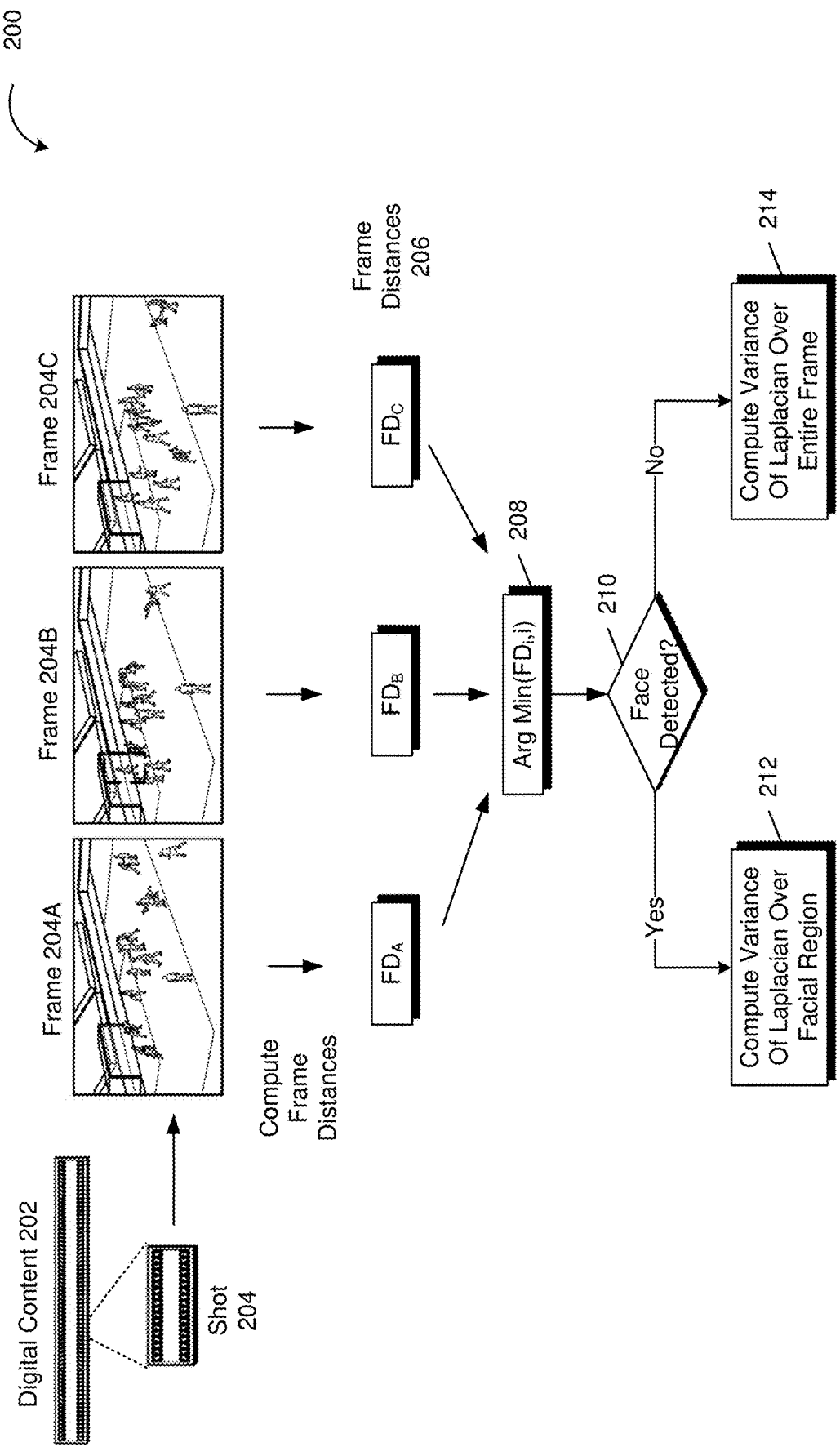
FIG. 2 illustrates a computing environment for key frame extraction, in accordance with one or more example embodiments of the present disclosure.

FIG. 2 illustrates a computing environment 200 for key frame extraction, in accordance with one or more example embodiments of the present disclosure. Techniques described in connection with FIG. 2 may be implemented in the context of embodiments discussed in connection with at least some of FIG. 1 and FIGS. 3-7.

In at least one embodiment, digital content 202 refers to a video or other multimedia content with visual and/or audio components. Digital content may refer to a file or continuous stream of multimedia content comprising image frames. Frames may be continuously displayed. Digital content 202 may be any suitable resolution, bitrate, encoding format, etc. Examples of digital content 202 include television shows, movies, advertisements, portions thereof, combinations thereof, and so forth.

In at least one embodiment, digital content 202 may be conceptually organized into smaller units. For example, the smallest unit of measure for digital content 202 may be an individual frame. Individual frames may refer to a still frame or image of a video and appears as a static image. When multiple frames are played together (e.g., at a fixed rate of 24 frames per second) a user may perceive a motion picture or video. Shot 204 may comprise a plurality of frames, for example, frame 204A, frame 204B, and frame 204C may be consecutive frames of shot 204. Shot 204 may comprise additional frames, which are omitted from FIG. 2 for clarity's sake.

A logical sequence of frames may be referred to as a shot. In at least one embodiment, digital content 202 is organized or segmented into a plurality of shots comprising shot 204. Shot 204 may be conceptually understood as a portion of a video that is shot from a particular perspective, viewpoint, or angle. Other units of measure may be used to organize digital content 202. For example, a plurality of frames may comprise a shot; a plurality of shots may comprise a scene; a plurality of scenes may comprise a sequence, and so forth. Various units of measure may be used to divide digital content 202 into contiguous portions. As illustrated in FIG. 2, digital content 202 may be organized into a plurality of shots comprising shot 204, as well as other shots. In at least one embodiment, digital content 202 is segmented into a plurality of non-overlapping shots.

Various techniques may be used to segment digital content 202 and determine shot 204. In at least one embodiment, a machine-learning model is used to analyze digital content 202 and determine a plurality of segments. In at least one embodiment, a scene detection model receives digital content 202 as an input and segments digital content 202 into a plurality of shots comprising shot 204 wherein the output of PySceneDetect indicates or is otherwise usable to determine when a respective shot starts and ends. In at least one embodiment, PySceneDetect is used to segment the entirety of digital content 202.

In at least one embodiment, a shot detection algorithm segments digital content 202 into N shots ($\phi_1 \ldots _N$). In various embodiments, a shot typically includes a temporal sequence of frames with semantically similar content. Frames of a shot may be sampled based on objective image quality. For example, a standard blind image-quality metric may be used to determine a quantitative score for a frame that measures its quality. Various types of blind or referenceless evaluators may be used, including but not limited to naturalness image quality evaluator (NIQE), perception-based image quality evaluator (PIQE), blind/referenceless image spatial quality evaluator (BRISQUE), and so forth.

In at least one embodiment, a NIQE score is computed for each frame of shot 204, including frame 204A, frame 204B, and frame 204C. For each frame $F_i$ belonging to a shot $\phi_j$, a NIQE score $d_{nige}$ may be computed, for example, in the following manner:

$$FD_i = d_{nige}(F_i) i \in \phi_j$$

The selected images that form candidates $C_k$ are the frames from each that have a minimum $d_{niqe}$. In various embodiments, selection process 208 is used to select a key frame from a plurality of frames of shot 204. In at least one embodiment, a candidate frame is selected as the frame of a shot having the lowest frame distance:

$$C_k = \underset{i}{\operatorname{argmin}}(d_{niqe}(F_i)) \forall \, i \in \phi_k \text{ and } k \in N$$

Accordingly, in at least one embodiment, a candidate frame is selected for shot 204, which may be approved for use as a key frame, subject to one or more visual quality metrics. For example, a visual quality metric may perform facial detection 210 on a candidate frame. Any suitable facial detection algorithm may be used. If a face is detected, the facial detection algorithm may, for example, compute, infer, or otherwise determine a region of the candidate frame that corresponds to a face if a face is present. The region may be expressed as a height, width, x-coordinate, and y-coordinate values. In at least one embodiment, a system perform a step to compute variance of the Laplacian over facial region 212 that was detected. The variance of the Laplacian (VOL) may be a quantitative measure of blurriness. In the case of candidate frames where faces are prominently featured, the VOL may be computed over the region corresponding to the face. For example, if the bounding box for a face occupies at least 40%, 50%, 60%, etc. of the pixels of a frame, then the face may be considered to detected and of sufficient size so that VOL is computed over the face and not the other portions of the frame. This may be because the blurriness of background portions of a frame are acceptable so long as prominently displayed faces are clear. Likewise, if no faces are detected, a system may determine that the candidate frame refers to a scene-based image and compute the VOL over the entire frame 214. Once the VOL is computed, it may be used to determine whether the candidate frame is sufficiently clear or if it is too blurry. A predetermined or customizable parameter may be used to determine the threshold for acceptable VOL values.

In some embodiments, visual quality metrics filter metrics measure VOL, brightness, illumination, color contrast, and so forth, to determine whether candidate frames are suitable for use as a key frame. For example, in face shots, the level of illumination needed for a visually pleasing frame may be higher than that for scene-based shots.

If a candidate frame satisfies one or more quality metrics, such as those discussed above and/or depicted in FIG. 2, the candidate frame may be chosen as a key frame. In some embodiments, scores are assigned to different visual quality metrics and used to compute an overall score (e.g., scaled from 1 to 100) that is used to determine suitable for use as a key frame.

However, if the candidate frame is determined to be unsuitable for use as a key frame, the frame with the second highest NIQE score $d_{niqe}$ may be obtained and evaluated for suitability as a key frame. This process may be repeated for the third highest, fourth highest, etc. scores until a suitable key frame is found.

Figure 3:
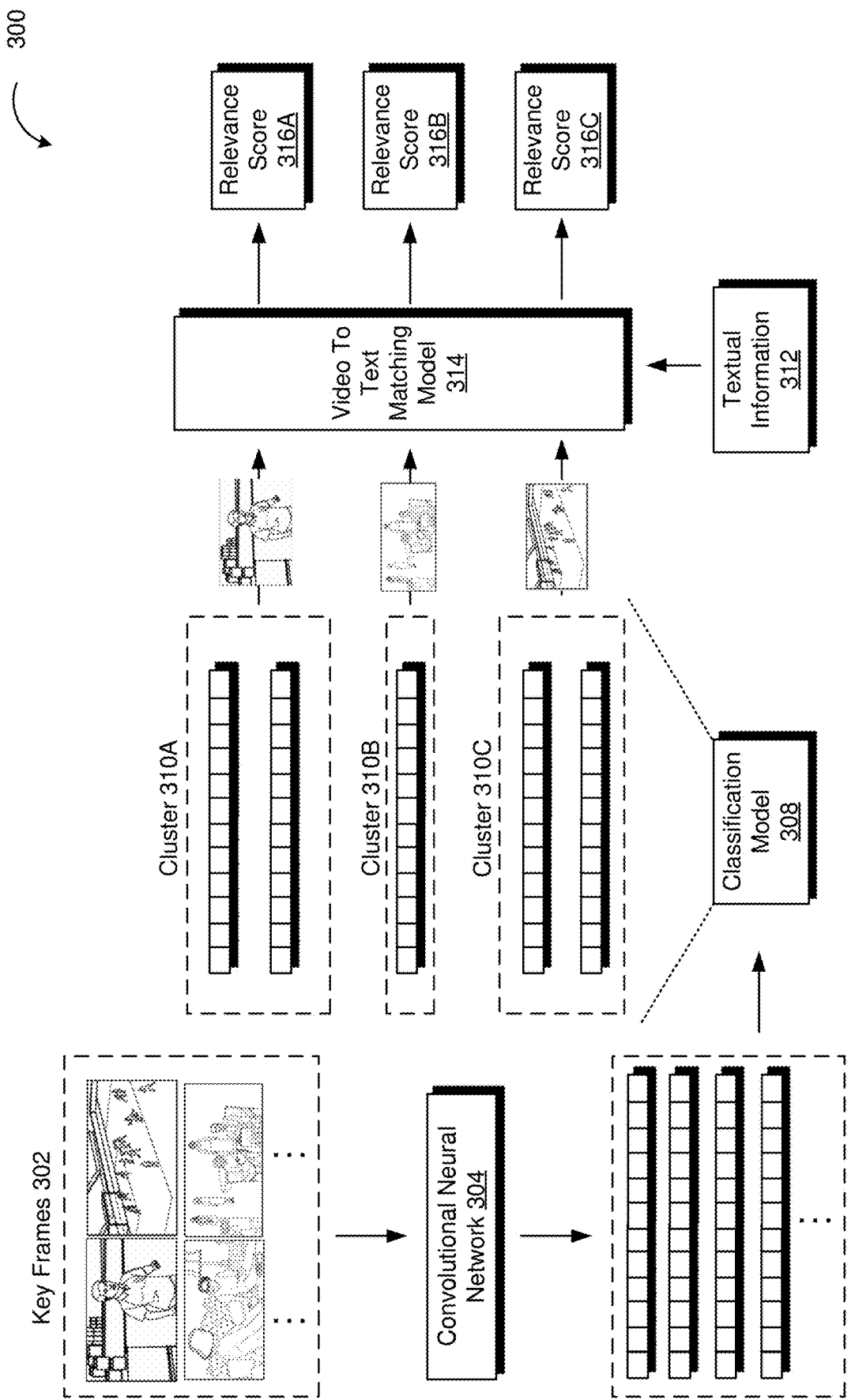
FIG. 3 illustrates a computing environment for determining relevance scores for key frames, in accordance with one or more example embodiments of the present disclosure.

FIG. 3 illustrates a computing environment 300 for determining relevance scores for key frames, in accordance with one or more example embodiments of the present disclosure. Techniques described in connection with FIG. 3 may be implemented in the context of embodiments discussed in connection with at least some of FIG. 1, FIG. 2, and FIGS. 4-7.

Key frames 302 may be key frames that are extracted from digital content, for example, using techniques described in connection with FIG. 2. In at least one embodiment, digital content such as a video file or stream is segmented into a plurality of shots and a key frame is extracted from each shot of the plurality of shots. Of course, fewer or greater numbers of key frames may be extracted. For example, in some cases, a key frame is extracted from every other shot. In some cases, two key frames are extracted from each shot. Regardless, a plurality of key frames 302 may be determined from a movie or other digital content.

Each key frame of the plurality of key frames may be analyzed and parsed for contextual information. For example, a system may iterate over each key frame to determine an embedding vector. FIG. 1 depicts an example where a first key frame of the plurality of key frames 302 is obtained and provided as an input into a convolutional neural network 304 such as ResNet-50. The convolutional neural network may require inputs to be of a certain form. For example, for a ResNet-50 model, key frame may be re-scaled to be 224×224 and the rescaled version of key frame may be provided as the input to the ResNet-50 model. In various embodiments, the last layer of ResNet-50 backbone model outputs embedding vectors 306. An embedding vector may be a one-dimensional array that encodes a vector or integer values that may be used to evaluate semantic similarity between images. One embedding vector may be generated for each key frame of the plurality of key frames 302.

In various embodiments, embedding vectors 306 are provided to a classification model 308 such as a k-NN classifier. In various embodiments, a classification model receives a collection of two or more objects and clusters sets of objects together based on similarity. For example, embedding vectors 306 may be classified using classification model 308 into a plurality of clusters. A cluster corresponds to a group of similar vectors. Embedding vectors that are close to each other based on their embedding vectors may be considered to be more visually similar than embedding vectors that are farther away from each other. FIG. 3 depicts an example in which a first cluster 310A comprises at least two key frames (represented by their corresponding embedding vectors), a second cluster 310B with a single key frame, and a third cluster with two key frames. Of course, this is merely an illustrative example and does not serve to limit the scope of the subject matter contemplated herein. In some embodiments, a user is able to select or customize the number of clusters to which key frames may be assigned. For example, the number of clusters k may be a predefined number, such as 5, 10, 20, 25, 50, and so forth. Frames may be clustered together based on facial similarity (e.g., for images where faces are detected), scenic similarity (e.g., where the overall frames are similar), and so forth.

In various embodiments, the plurality of key frames 302 are used to generate a corresponding plurality of embedding vectors 304. The plurality of embedding vectors 304 may be grouped into a plurality of clusters 310. According to various embodiments, the clusters may be used to group key frames 302 into groups of visually similar key frames based on facial similarity, scenic similarity, and so forth. Relevance scores may be generated for the clusters. For example, cluster 310A may be used to determine a corresponding cluster or group of key frames. Each of the key frames in cluster 310A may be provided as an input alongside textual information 312 to CLIP model 314. Textual information 312 may refer to a summary, description, or other text-based information regarding the substance of the underlying digital content. This information may be manually generated, translated, or otherwise created.

Continuing with the example, a first relevance sub-score may be generated based on a first key frame of a first cluster. A second relevance sub-score may be generated by providing a second key frame of cluster 310A to clip model 314 as an input to compare the contents of the second key frame with textual information 312. This process may be repeated for each key frame in cluster 310A. Once sub-scores have been generated for each key frame in cluster 310A, a relevance score 316A may be generated for cluster 310A. For example, relevance score 316A may be the average of the sub-scores of the key frames associated with cluster 310A. Relevance score 316A may be set equal to the highest sub-score. Other suitable techniques for determining relevance score for a group of key frames are contemplated in the scope of this disclosure.

In various embodiments, a second relevance score 316B is generated for a corresponding second cluster 310B, third relevance score 316C is generated for third cluster 310C, and so forth, until relevance scores are generated for all clusters that were identified by classification model 308.

Clusters' aggregate relevance scores may be tabulated and presented in an ordered list (e.g., in descending order) so as to provide discoverability results ranked based on how similar the key frames of each group are to textual information 312.

Figure 4:
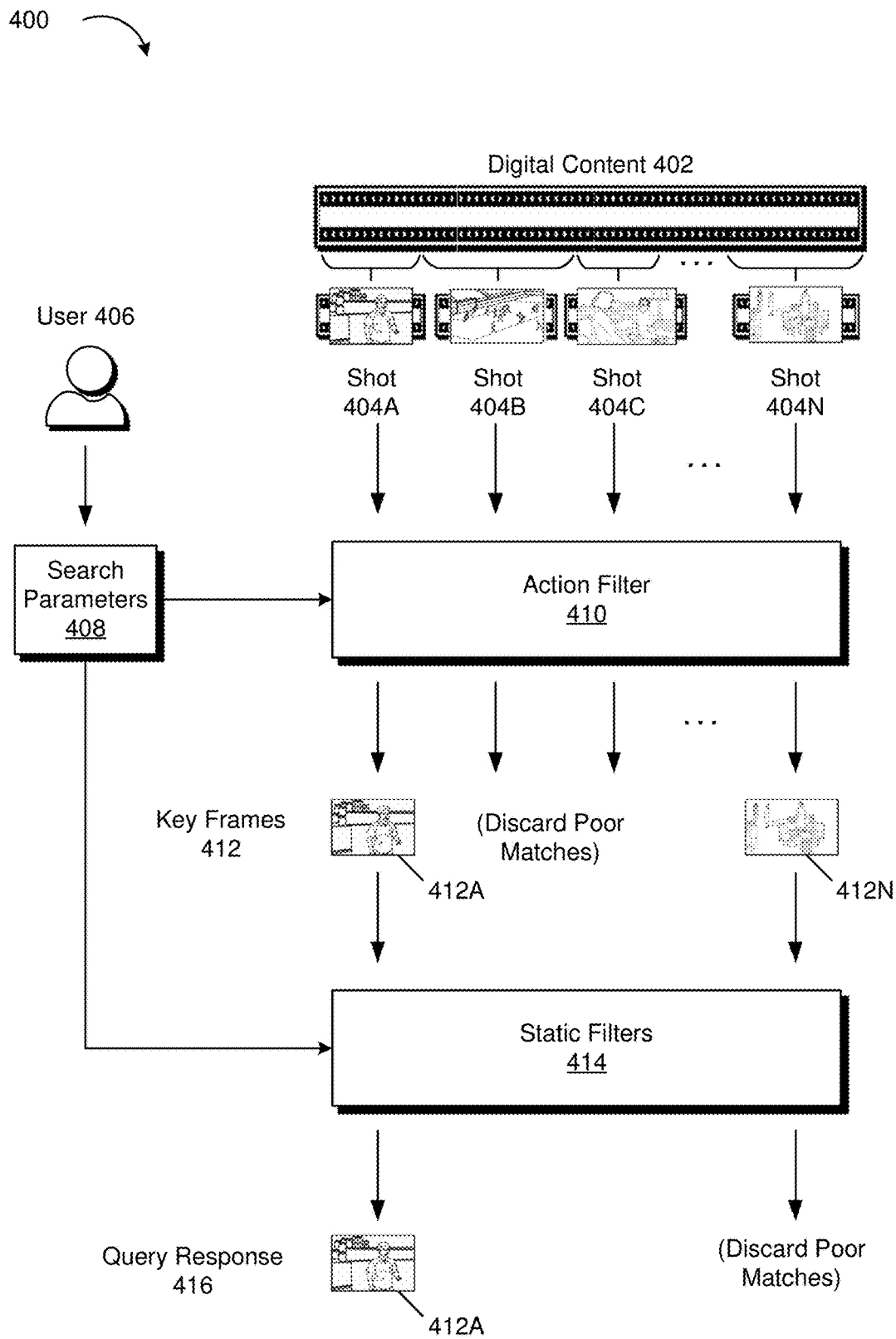
FIG. 4 illustrates a computing environment that implements searchability of digital content for contextually relevant frames, shots, etc., in accordance with one or more example embodiments of the present disclosure.

FIG. 4 illustrates a computing environment 400 that implements searchability of digital content for contextually relevant frames, shots, etc., in accordance with one or more example embodiments of the present disclosure. Techniques described in connection with FIG. 4 may be implemented in the context of FIG. 7, for example, using a searchability subsystem.

In at least one embodiment, digital content 402 is conceptually organized into smaller units. For example, the smallest unit of measure for digital content 402 may be an individual frame. Individual frames may refer to a still frame or image of a video and appears as a static image. When multiple frames are played together (e.g., at a fixed rate of 24 frames per second) a user may perceive a motion picture or video.

A logical sequence of frames may be referred to as a shot. In at least one embodiment, digital content 402 is organized or segmented into a plurality of shots 404A-N. For example, shot 404A may be conceptually understood as a portion of a video that is shot from a particular perspective, viewpoint, or angle. Other units of measure may be used to organize digital content 402. For example, a plurality of frames may comprise a shot; a plurality of shots may comprise a scene; a plurality of scenes may comprise a sequence, and so forth. Various units of measure may be used to divide digital content 402 into contiguous portions. As illustrated in FIG. 4, digital content 402 may be organized into shot 404A, shot 404B, shot 404C, and so forth. In at least one embodiment, digital content 402 is segmented into a plurality of non-overlapping shots.

Various techniques may be used to segment digital content 402 and determine shots 404A-N. In at least one embodiment, a machine-learning model is used to analyze digital content 402 and determine a plurality of segments. In at least one embodiment, a scene detection algorithm receives digital content 402 as an input and segments digital content 402 into a plurality of shots 404A-N, wherein the output of PySceneDetect indicates or is otherwise usable to determine when a respective shot starts and ends. In at least one embodiment, PySceneDetect is used to segment the entirety of digital content 402.

In various embodiments, a user 406 refers to an individual or a computer system under the control of an individual, such as those described in connection with FIG. 7. Search parameters 408 may be generated by user 406, for example, through a user interface that allows user 406 to specify various search strings, filters, and the like. In at least one embodiment, search parameters comprise action filters and/or static filters. Action filters may refer to search parameters that are evaluated based on a shot or collection of frames rather than a single frame in isolation. As an example, a user may specify search parameters 408 indicating the user is looking for a "car chase"—where an action filter may be used to determine whether specific shots such as shot 404A depict a car chase and process the request accordingly. Action filters may be contrasted to static filters, which may be evaluated based on a single frame in isolation. As an example, a user may specify search parameters 408 indicating that user 406 is searching for frames with a specific person. As facial recognition may be performed using a single frame, a static filter may be used to process such a search request.

In at least one embodiment, digital content 402 is segmented into a plurality of shots 404A-N. A machine-learning model may be used to perform NLP-enriched video segmentation, for example, using PySceneDetect. Digital content 402 may be segmented asynchronously of user search requests.

In some embodiments, user 406 generates, specifies, or otherwise determines search parameters 408. If the search parameters include an action to search for, then action filter 410 may be applied to one or more shots of the plurality of shots. Other units of measure may be searched—for example, an action filter may be used to evaluate whether a scene comprising a plurality of shots is semantically similar to the specified search parameters.

In at least one embodiment, action filter 410 comprises one or more filters to evaluate segments (e.g., shots, scenes, etc. of digital content 402) against textual information such as search parameters 408. In at least one embodiment, each shot is matched against the search query using a pre-trained video to text matching model such as those discussed above. In at least one embodiment, a convolutional neural network is used to determine a first embedding vector for the textual information (e.g., from search parameters 408) and an aligned second embedding vector is determined for a shot. The embedding vectors may be compared using cosine similarity or other suitable measures of similarity between embedding vectors to determine whether a shot is semantically similar to an action or text-based scene description. Embedding vectors may have 256, 512, 1024, 2048, 4096, etc. elements, as is appropriate for a given use case. Action filter 410 may utilize one or more machine-learning techniques, such as multiple instance learning and noise contrastive estimation (MIL-NCE) model to determine whether a shot is contextually relevant based on textual information provided by a user in a search query.

As an example, and in reference to FIG. 4, a first embedding vector may be generated based on search parameters 408 comprising text-based description of a scene that user 406 wishes to search for. A searchability subsystem may generate a second embedding vector for shot 404A and compare the semantic similarity between shot 404A and the textual information. Continuing with this example, if shot 404A is sufficiently similar to the textual information based on a comparison of their embedding vectors, shot 404A may be retained. Conversely, a third embedding vector may be generated for shot 404B and compared against the first embedding vector. Continuing with the example, if it is determined, based on the first and third embedding vectors, that shot 404B is not semantically similar to the textual information, then shot 404B may be discarded and excluded from downstream processing. These steps may be performed for each shot, or only a portion of shots, of digital content 402. As depicted in FIG. 4, shot 404B and shot 404C may be excluded due to their images being visually dissimilar to the textual information specified in the search query.

Key frames 412 may be extracted for the shots that were determined to satisfy the processing and/or analysis performed by action filter 410. For example, shot 404A may be determined to be contextually relevant to a text-based description provided by user 406. Shot 404A may, accordingly, be analyzed to extract a key frame 412A from a plurality of frames in shot 404A. Key frame 412A may be determined using techniques described in connection with FIGS. 1-3. Note, additionally, that key frames for shot 404B and shot 404C do not need to be determined, as they have been discarded or filtered out by action filter 410 as being contextually irrelevant to the search query. Conversely, key frame 412N may be determined based on a determination that shot 404N is contextually relevant to the search query.

Search parameters 408 specified by user 406 may be used to evaluate one or more static filters 414. In a search query, user 406 may specify that she is looking specifically for frames with a specific character, a specific general frame emotion, for a location or landmark, and so on. In various embodiments, user 406 specifies a list of characters from digital content 402 and at static filters 414, a face recognition model may be run on each of the faces in a key frame to determine whether the key frame satisfies the filter. For example, user 406 may specify a static filter to find frames in which a first identity (e.g., main actor) and second identity (e.g., co-actor) of a movie are both present. For illustrative purposes, if user 406 submits a search query for a first identity (e.g., actor) and that identity actor is not in key frame 412N, then key frame 412N may be discarded from downstream processing and search results as being contextually irrelevant to the user's search query.

In some embodiments, user 406 specifies a general frame emotion. For each large character frame, a pre-trained emotion-classifier model may be used to determine a probability for the specified emotion across all faces detected in a key frame. If a single face is detected, the emotion score for the frame is set to the emotion score of the single face. If two or more faces are in a key frame, the emotion score of the key frame may be a weighted or unweighted average of the emotion score of the two or more faces. For example, weights may be determined in proportion to how large the faces are (e.g., as measured in pixels) in the key frame.

For identifying frames with landmarks or locations, a classification model may be used to evaluate each frame to match the user request. For example, a user's search query may specify that she wants frames with "London Bridge" and key frames that do not depict London Bridge may be excluded.

Key frames that satisfy the user's search parameters may be returned as search results. In some embodiments, key frames are ranked based on a relevance score or other information. For example, if a user searches for an "action scene" several shots may be discarded as being contextually irrelevant to action scenes due to low similarity to the textual information. For the remaining key frames, they may be scored based on how similar they are to the textual information and ranked based on the similarity scores or relevance.

Frames that satisfy the search parameters specified by user 406 may be provided to the user in a query response 416. For example, as depicted in FIG. 4, a query response 416 may include or otherwise indicate each frame that satisfied the filters specified in search parameters 408. In the example depicted in FIG. 4, frame 412A may satisfy the search parameters whereas frame 412B and 412C are poor matches with respect to action filters and frame 412N is a poor match with regard to the static filters. Other frames from other shots not specifically illustrated in FIG. 4 may nevertheless still satisfy the filters and be included as part of query response 416.

Figure 5:
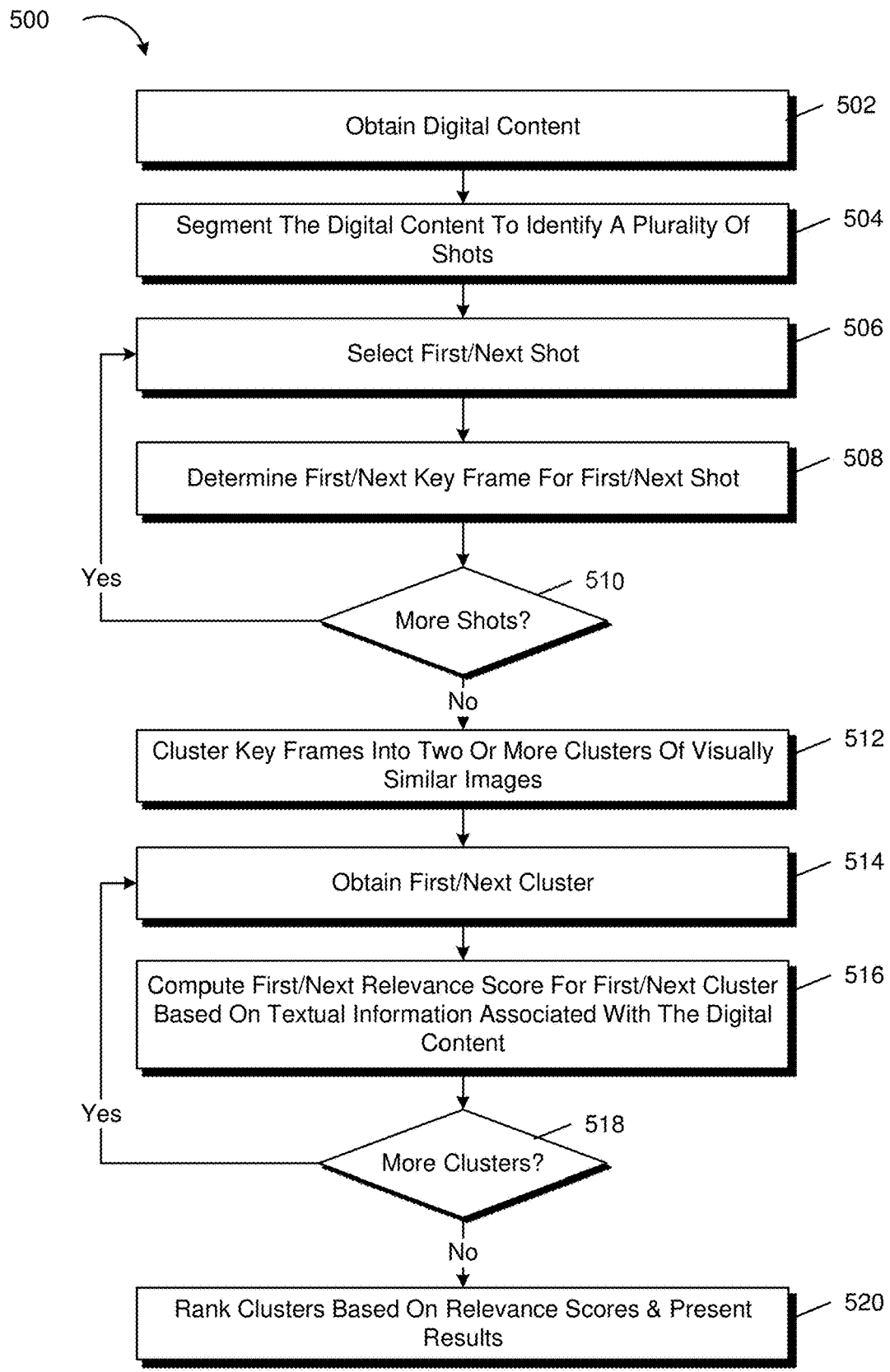
FIG. 5 shows an illustrative example of a process for discovery of contextually relevant frames of digital content, in accordance with one or more example embodiments of the present disclosure.

FIG. 5 shows an illustrative example of a process 500 for discovery of contextually relevant frames of digital content, in accordance with one or more example embodiments of the present disclosure. In at least one embodiment, some or all of the process 500 (or any other processes described herein, or variations and/or combinations thereof) is performed under the control of one or more computer systems that store computer-executable instructions and may be implemented as code (e.g., computer-executable instructions, one or more computer programs, or one or more applications) executing collectively on one or more processors, by hardware, software, or combinations thereof. The code, in at least one embodiment, is stored on a computer-readable storage medium in the form of a computer program comprising a plurality of computer-readable instructions executable by one or more processors. The computer-readable storage medium, in at least one embodiment, is a non-transitory computer-readable medium. In at least one embodiment, at least some of the computer-readable instructions usable to perform the process 500 are not stored solely using transitory signals (e.g., a propagating transient electric or electromagnetic transmission). A non-transitory computer-readable medium does not necessarily include non-transitory data storage circuitry (e.g., buffers, caches, and queues) within transceivers of transitory signals. Process 500 may be implemented in the context of various systems and methods described elsewhere in this disclosure, such as those discussed in connection with FIGS. 1 and 7. In at least one embodiment, process 500 or a portion thereof is implemented by a computing resource service provider. FIG. 5 may be implemented, for example, using a discoverability subsystem described in connection with FIG. 7.

In at least one embodiment, process 500 comprises a step to obtain 502 digital content. In at least one embodiment, digital content refers to a video or other multimedia content with visual and/or audio components. Digital content may refer to a file or continuous stream of multimedia content comprising image frames. Frames may be continuously displayed (e.g., at a rate of over 20 image frames per second). Digital content may be any suitable resolution, bitrate, encoding format, etc. Examples of digital content include television shows, movies, advertisements, portions thereof, combinations thereof, and so forth. A user may select digital content from a catalog of digital contents to perform discoverability on. In at least one embodiment, a user determines multimedia content by selecting multimedia content from a library of multimedia content.

In at least one embodiment, process 500 comprises a step to segment 504 the digital content to identify a plurality of shots. Various techniques may be used to segment digital content and determine a plurality of shots. In at least one embodiment, a machine-learning model is used to analyze digital content and determine a plurality of segments. In at least one embodiment, a shot detection algorithm segments multimedia content into N shots ($\phi_1 \ldots _N$). In at least one embodiment, a scene detection algorithm receives digital content as an input and segments digital content into a plurality of shots, wherein the output of PySceneDetect indicates or is otherwise usable to determine when a respective shot starts and ends. In at least one embodiment, PySceneDetect is used to segment the entirety of a video or multimedia. A shot may comprise a plurality of frames.

In at least one embodiment, process 500 comprises a step to select 506 a first shot. Shots may be selected sequentially or in any other suitable manner. In at least one embodiment, process 500 comprises a step to determine 508 a key frame for the first shot. In various embodiments, a shot typically includes a temporal sequence of frames with semantically similar content. Frames of a shot may be sampled based on objective image quality. For example, a standard blind image-quality metric may be used to determine a quantitative score for a frame that measures its quality. Various types of blind or referenceless evaluators may be used, including but not limited to naturalness image quality evaluator (NIQE), perception-based image quality evaluator (PIQE), blind/referenceless image spatial quality evaluator (BRISQUE), and so forth.

In at least one embodiment, a NIQE score is computed for each frame of the first shot. For each frame $F_i$ belonging to a shot $\phi_1$, a NIQE score $d_{niqe}$ may be computed, for example, in the following manner:

$$FD_i = d_{niqe}(F_i) i \in \phi_1$$

Frames of the first shot may be ordered based on their frame distance. A key frame from a plurality of frames of the first shot. In at least one embodiment, a candidate frame is selected as the frame of the first shot having the lowest frame distance:

$$C_k = \operatorname*{argmin}_i (d_{niqe}(F_i)) \forall\ i \in \phi_1\ \text{and}\ k \in N$$

Accordingly, in at least one embodiment, a candidate frame is selected for the first shot, which may be approved for use as a key frame, subject to one or more visual quality metrics. For example, a visual quality metric may perform facial detection on a candidate frame. Any suitable facial detection algorithm may be used. If a face is detected, the facial detection algorithm may, for example, compute, infer, or otherwise determine a region of the candidate frame that corresponds to a face if a face is present. The region may be expressed as a height, width, x-coordinate, and y-coordinate values. In at least one embodiment, a system perform a step to compute variance of the Laplacian over facial region that was detected. The variance of the Laplacian (VOL) may be a quantitative measure of blurriness. In the case of candidate frames where faces are prominently featured, the VOL may be computed over the region corresponding to the face. For example, if the bounding box for a face occupies at least 40%, 50%, 60%, etc. of the pixels of a frame, then the face may be considered to detect a sufficient size so that VOL is computed over the face and not the other portions of the frame. This may be because blurriness of background portions of a frame are acceptable so long as prominently displayed faces are clear. Likewise, if no faces are detected, a system may determine that the candidate frame refers to a scene-based image and compute the VOL over the entire frame. Once the VOL is computed, it may be used to determine whether the candidate frame is sufficiently clear or if it is too blurry. A predetermined or customizable parameter may be used to determine the threshold for acceptable VOL values.

In at least one embodiment, process 500 comprises a step to determine whether 510 there are more shots to iterate over. For example, for a second shot, the second shot may be selected and a key frame for the second shot may be determined, for example, as described above. Each shot of the digital content may be iterated over to determine a key frame for each shot.

In at least one embodiment, process 500 comprises a step to cluster 512 key frames into two or more clusters of visually similar images. A machine-learning model may compare key frames images using a K nearest neighbor (K-NN) classification model to determine a similarity score between the key frames. The similarity score may be scaled from 0 to 1, with 0 indicating a high degree of visual dissimilarity and 1 indicating a very high visual similarity between the images being compared. In some cases, the similarity score is a value between 0 and a maximum value such as 100. A K-NN classification model may be configured to generate a predetermined number of clusters of images based on visual similarity.

In at least one embodiment, process 500 comprises a step to obtain 514 a first cluster. Clusters may be obtained in any suitable manner. In at least one embodiment, process 500 comprises a step to compute 516 a relevance score for the first cluster based on textual information associated with the digital content. A relevance score may refer to a score indicating how contextually relevant a cluster of images is to the textual information. For example, if the textual information describes an action-packed movie with dramatic chases, a cluster of images relating to a car chase and explosions may have high contextual relevance. In at least one embodiment, a relevance score for a cluster is generated by computing relevance sub-scores for each key frame in the cluster. A CLIP model may be used to generate a sub-score that indicates how contextually relevant a key frame of a cluster is to the textual information associated with the multimedia content. Sub-scores may be generated for each key frame in a cluster and a weighted or unweighted average may be generated as the relevance score for the cluster.

In at least one embodiment, process 500 comprises a step to determine whether 518 there are more clusters. For example, each cluster may be iterated over to generate sub-scores and/or scores to determine how contextually relevant a cluster is to the textual information associated with the digital content. Once all clusters have been analyzed for contextual relevance, a system may rank 520 clusters based on relevance scores and present discoverability results to a user. Discoverability results may be ranked based on how contextually relevant the identified key frames are to the textual information associated with the multimedia content.

Figure 6:
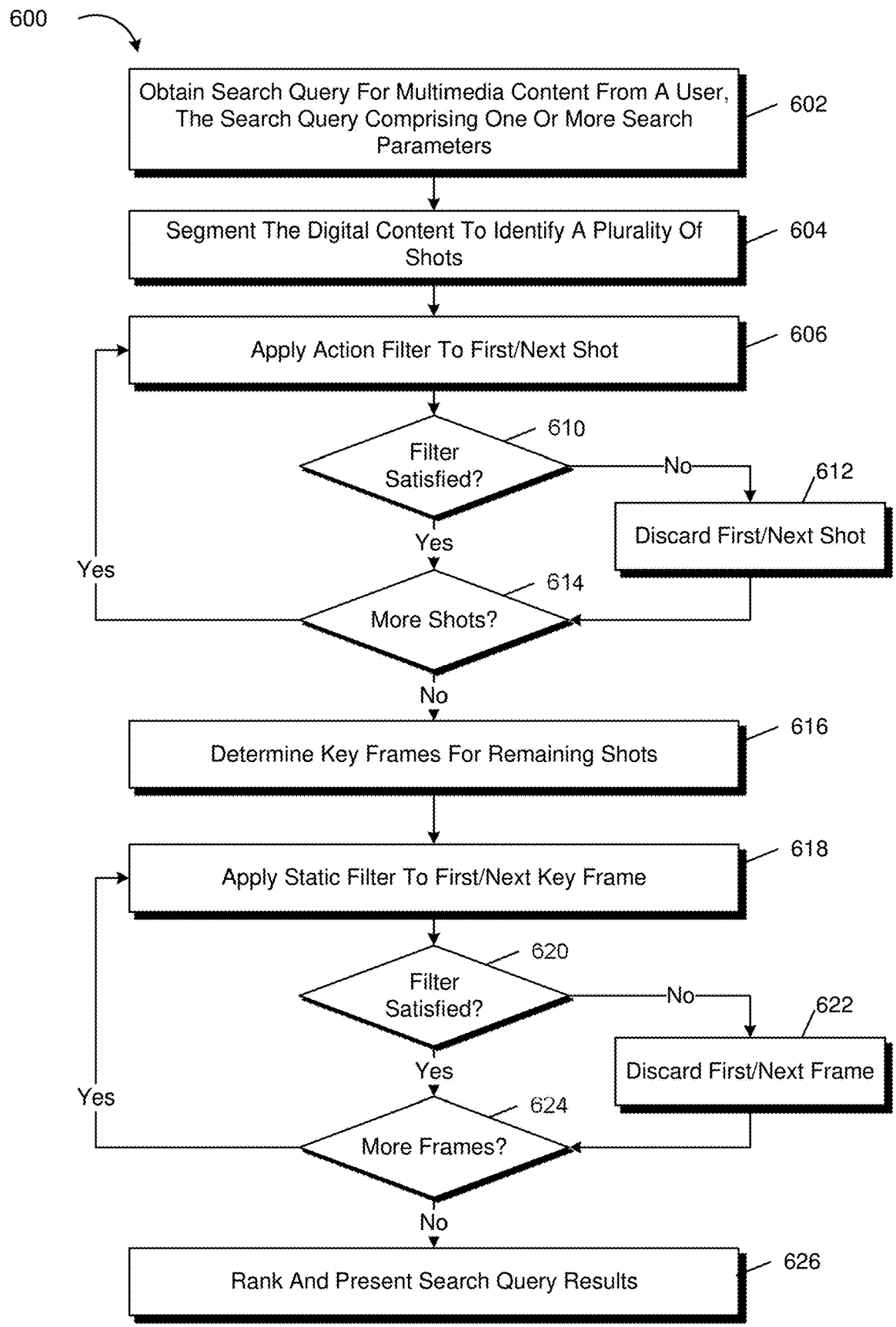
FIG. 6 shows an illustrative example of a process for performing a search query on multimedia content to find contextually relevant frames, in accordance with one or more example embodiments of the present disclosure.

FIG. 6 shows an illustrative example of a process 600 for performing a search query on multimedia content to find contextually relevant frames, in accordance with one or more example embodiments of the present disclosure. In at least one embodiment, some or all of the process 600 (or any other processes described herein, or variations and/or combinations thereof) is performed under the control of one or more computer systems that store computer-executable instructions and may be implemented as code (e.g., computer-executable instructions, one or more computer programs, or one or more applications) executing collectively on one or more processors, by hardware, software, or combinations thereof. The code, in at least one embodiment, is stored on a computer-readable storage medium in the form of a computer program comprising a plurality of computer-readable instructions executable by one or more processors. The computer-readable storage medium, in at least one embodiment, is a non-transitory computer-readable medium. In at least one embodiment, at least some of the computer-readable instructions usable to perform the process 600 are not stored solely using transitory signals (e.g., a propagating transient electric or electromagnetic transmission). A non-transitory computer-readable medium does not necessarily include non-transitory data storage circuitry (e.g., buffers, caches, and queues) within transceivers of transitory signals. Process 600 may be implemented in the context of various systems and methods described elsewhere in this disclosure, such as those discussed in connection with FIGS. 1 and 7. In at least one embodiment, process 600 or a portion thereof is implemented by a computing resource service provider. FIG. 6 may be implemented, for example, using a searchability subsystem described in connection with FIG. 7

In at least one embodiment, process 600 comprises a step to obtain 602 search query for digital content from a user, the search query comprising one or more search parameters. The one or more search parameters may include various search parameters that may be processed using action and/or static filters. Action filters may be used to evaluate query parameters against a shot, scene, or otherwise evaluates a set of frames to determine contextual relevance. Static filters may be used to evaluate query parameters against a frame, image, or region thereof.

In at least one embodiment, process 600 comprises a step to segment 604 the digital content to identify a plurality of shots. Various techniques may be used to segment digital content and determine a plurality of shots. In at least one embodiment, a machine-learning model is used to analyze digital content and determine a plurality of segments. In at least one embodiment, a shot detection algorithm segments multimedia content into N shots ($\phi_1 \ldots \phi_N$). In at least one embodiment, a scene detection algorithm receives digital content as an input and segments digital content into a plurality of shots, wherein the output of PySceneDetect indicates or is otherwise usable to determine when a respective shot starts and ends. In at least one embodiment, PySceneDetect is used to segment the entirety of a video or multimedia. A shot may comprise a plurality of frames.

In at least one embodiment, process 600 comprises a step to apply 606 one or more action filters to a first shot of the plurality of shots. In at least one embodiment, action filter comprises one or more filters to evaluate segments (e.g., shots, scenes, etc. of digital content 402) against textual information included in a user-provided search query. In at least one embodiment, a first shot is matched against the search query using a pre-trained video to text matching model such as those discussed above. In at least one embodiment, a convolutional neural network is used to determine a first embedding vector for the textual information (e.g., from search parameters) and an aligned second embedding vector is determined for a first shot. The embedding vectors may be compared using cosine similarity or other suitable measures of similarity between embedding vectors to determine whether a shot is semantically similar to an action or text-based scene description. Embedding vectors may have 256, 512, 1024, 2048, 4096, etc. elements, as is appropriate for a given use case.

In at least one embodiment, process 600 comprises a step to determine whether 608 the action filter was satisfied. Action filters may be satisfied by computing a cosine similarity score between embedding vectors extracted from a shot and text-based query parameter. If the cosine similarity score exceeds a threshold value, then the filter is satisfied; otherwise the filter is not satisfied, according to at least one embodiment.

In at least one embodiment, process 600 comprises a step to discard 610 the first shot if the filter was not satisfied. A shot that is discarded or disregarded may be removed from consideration of downstream steps and may be omitted from search query results.

In at least one embodiment, process 600 comprises a step to determine whether 612 there are more shots. For example, steps 606-610 may be performed or evaluated for each shot of the plurality of shots to identify which shots (if any) of the digital content satisfy the one or more action filters. If no shots satisfy the action filter, process 600 may immediately terminate and provide a response to the search query indicating that no results were found.

In at least one embodiment, process 600 comprises a step to determine 614 key frames for the remaining shots. Key frames may be determined in any suitable manner, for example, as described above in connection with FIG. 2.

In at least one embodiment, process 600 comprises a step to apply 616 one or more static filters to a first key frame of the remaining shots. In a search query, a user may specify various properties that should be present in a search result. For example, a search query may indicate that a particular person, landmark, or emotion is being requested. In various embodiments, a user specifies a list of characters from digital content and at static filters, a face recognition model may be run on each of the faces in a key frame to determine whether the key frame satisfies the filter. For example, a user may specify a static filter to find frames in which the main actor and co-actor of a movie are both present. For illustrative purposes, if a user submits a search query for a specific actor and that actor is not in the first key frame, then the first key frame may be discarded from downstream processing and search results as being contextually irrelevant to the user's search query.

In some embodiments, a user specifies a general frame of emotion. For each large character frame, a pre-trained emotion-classifier model may be used to determine a probability for the specified emotion across all faces detected in a key frame. If a single face is detected, the emotion score for the frame is set to the emotion score of the single face. If two or more faces are in a key frame, the emotion score of the key frame may be a weighted or unweighted average of the emotion score of the two or more faces. For example, weights may be determined in proportion to how large the faces are (e.g., as measured in pixels) in the key frame.

For identifying frames with landmarks or locations, a classification model may be used to evaluate each frame to match the user request. For example, a user's search query may specify that she wants frames with "London Bridge" and key frames that do not depict London Bridge may be excluded.

In at least one embodiment, process 600 comprises a step to determine 618 whether the static filters were satisfied. In at least one embodiment, process 600 comprises a step to discard 620 the first key frame if the filter was not satisfied. A key frame that is discarded or disregarded may be removed from consideration of downstream steps and may be omitted from search query results.

In at least one embodiment, process 600 comprises a step to determine whether 622 there are more key frames. For example, steps 616-620 may be performed or evaluated for each key frame of the remaining shots to identify which key frames (if any) satisfy the one or more static filters. In at least one embodiment, process 600 comprises a step to rank and present search query results 624.

One or more operations of the methods, process flows, or use cases of FIGS. 1-7 may have been described above as being performed by a user device, or more specifically, by one or more program module(s), applications, or the like executing on a device. It should be appreciated, however, that any of the operations of the methods, process flows, or use cases of FIGS. 1-7 may be performed, at least in part, in a distributed manner by one or more other devices, or more specifically, by one or more program module(s), applications, or the like executing on such devices. In addition, it should be appreciated that processing performed in response to execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-7 may be described in the context of the illustrative devices, it should be appreciated that such operations may be implemented in connection with numerous other device configurations.

The operations described and depicted in the illustrative methods, process flows, and use cases of FIGS. 1-7 may be carried out or performed in any suitable order, such as the depicted orders, as desired in various example embodiments of the disclosure. Additionally, in certain example embodiments, at least a portion of the operations may be carried out in parallel. Furthermore, in certain example embodiments, less, more, or different operations than those depicted in FIGS. 1-7 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

The examples presented herein are not meant to be limiting.

Figure 7:
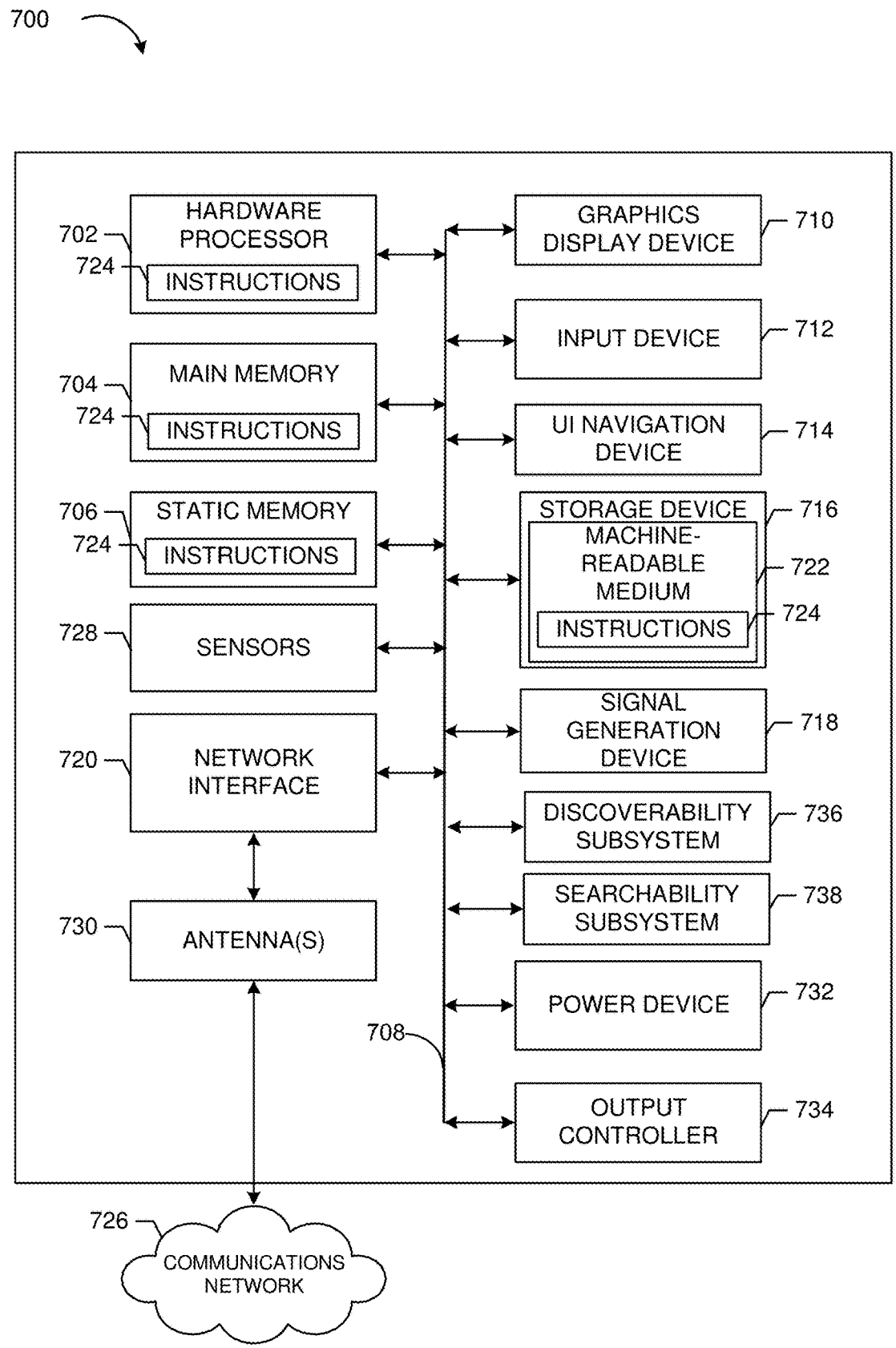
FIG. 7 illustrates a block diagram of an example machine upon which any of one or more techniques (e.g., methods) may be performed, in accordance with one or more example embodiments of the present disclosure.

FIG. 7 illustrates a block diagram of an example of a machine 700 (e.g., implemented in whole or in part in the context of embodiments described in connection with other figures. In some embodiments, the machine 700 may operate as a standalone device or may be connected (e.g., networked) to other machines. In a networked deployment, the machine 700 may operate in the capacity of a server machine, a client machine, or both in server-client network environments. In an example, the machine 700 may act as a peer machine in Wi-F$_i$ direct, peer-to-peer (P2P) (or other distributed) network environments. The machine 700 may be a wearable device or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 700 may include any combination of the illustrated components. For example, the machine 700 may include a hardware processor 702 (e.g., a central processing unit (CPU), a graphics processing unit (GPU), a hardware processor core, or any combination thereof), a main memory 704 and a static memory 706, some or all of which may communicate with each other via an interlink (e.g., bus) 708. The machine 700 may further include a power management device 732, a graphics display device 710, an alphanumeric input device 712 (e.g., a keyboard), and a user interface (UI) navigation device 714 (e.g., a mouse). In an example, the graphics display device 710, alphanumeric input device 712, and UI navigation device 714 may be a touch screen display. The machine 700 may additionally include a storage device (e.g., drive unit) 716, a signal generation device 718, and a network interface device/transceiver 720 coupled to antenna(s) 730. The machine 700 may include an output controller 734, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, other sensors, etc.)).

The storage device 716 may include a machine readable medium 722 on which is stored one or more sets of data structures or instructions 724 (e.g., software) embodying or utilized by any one or more of the techniques or functions described herein. The instructions 724 may also reside, completely or at least partially, within the main memory 704, within the static memory 706, or within the hardware processor 702 during execution thereof by the machine 700. In an example, one or any combination of the hardware processor 702, the main memory 704, the static memory 706, or the storage device 716 may constitute machine-readable media.

While the machine-readable medium 722 is illustrated as a single medium, the term "machine-readable medium" may include a single medium or multiple media (e.g., a centralized or distributed database, and/or associated caches and servers) configured to store the one or more instructions 724.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 700 and that cause the machine 700 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 724 may further be transmitted or received over a communications network 726 using a transmission medium via the network interface device/transceiver 720 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®), IEEE 802.16 family of standards known as WiMax®), IEEE 802.15.4 family of standards, and peer-to-peer (P2P) networks, among others. In an example, the network interface device/transceiver 720 may include one or more physical jacks (e.g., Ethernet, coaxial, or phone jacks) or one or more antennas to connect to the communications network 726. In an example, the network interface device/transceiver 720 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 700 and includes digital or analog communications signals or other intangible media to facilitate communication of such software.

Discoverability subsystem 736 may refer to software, hardware, or a combination thereof that implements various functionalities, such as determination of relevance scores as those described in connection with FIG. 1, FIG. 5, and so forth. Searchability subsystem 738 may refer to software, hardware, or a combination thereof that implements various functionalities, such as those described in connection with FIG. 4 and FIG. 6. Machine 700 may, according to at least one embodiment, implements some or all functionality described in connection with FIGS. 1-6.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device." "user device." "communication station." "station." "handheld device." "mobile device." "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating." when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second." "third," etc., to describe a common object, merely indicates that different instances of like objects are being referred to and are not intended to imply that the objects so described must be in a given sequence, either temporally, spatially, in ranking, or in any other manner.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, biomedical sensors, wearable devices or sensors, cellular radiotelephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

It is understood that the above descriptions are for purposes of illustration and are not meant to be limiting.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in any applicable flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in any flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which may be used to store the information and which may be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

What is claimed is:

1. A system, comprising:
   one or more processors; and
   memory storing executable instructions that, as a result of execution by the one or more processors, cause the system to:
   determine a search query, the search query comprising one or more search parameters and indicating a multimedia content for performance of the search query;
   determine a plurality of shots for the multimedia content, wherein a first shot of the plurality of shots comprises a first plurality of frames;
   select, based on one or more quality metrics, a first frame from the first plurality of frames;
   determine, using a first neural network, a first embedding vector for the first frame;
   determine, using the first neural network, a second embedding vector for a second frame, wherein a second shot of the plurality of shots comprises the second frame of a second plurality of frames of the second shot;
   determine, using a classification model and based on the first embedding vector and the second embedding vector, a first group of visually similar frames, wherein the first group comprises the first frame and the second frame;
   determine, using a second neural network and based on textual information associated with the multimedia content, a first relevance score for the first group of visually similar frames; and
   determine, based on the first relevance score, the first frame and the second frame as results of the search query.

2. The system of claim 1, wherein executable instructions include further instructions that, as a result of execution by the one or more processors, further cause the system to:
   determine a third shot of the plurality of shots, wherein the third shot comprises a second plurality of frames;
   select, based on the one or more quality metrics, a third frame from the second plurality of frames;
   determine, using the first neural network, a third embedding vector for the third frame;
   determine, using the classification model and based on the third embedding vector, a second group of visually similar frames, wherein the second group comprises the third frame, further wherein the second group is visually dissimilar to the first group;
   determine, using the second neural network model and based on the textual information associated with the multimedia content, a second relevance score for the second group; and
   generate a ranking based on the first relevance score and second relevance score.

3. The system of claim 1, wherein the instructions to select the first frame from the plurality of frames based on the one or more quality metrics include instructions that, as a result of execution by the one or more processors, cause the system to:
   compute a frame difference for the first frame and an adjacent frame to the first frame;
   determine a region of the first frame based on detection of facial features in the first frame;
   determine a first variance of Laplacian (VOL) for the region; and
   determine the first VOL is less than a predetermined threshold.

4. The system of claim 3, wherein the region comprises the first frame.

5. The system of claim 1, wherein the instructions to determine, using the second neural network and based on the textual information associated with the multimedia content, the first relevance score for the first group of visually similar frames includes instructions that, as a result of execution by the one or more processors, cause the system to:
determine, using the second neural network, based on the first frame and the textual information associated with the multimedia content, a first sub-score;
determine, using the second neural network, based on the second frame and the textual information associated with the multimedia content, a second sub-score; and
determine the first relevance score based on the first sub-score and the second sub-score.

6. The system of claim 1, wherein the classification model is a k-nearest neighbor (k-NN) classification model.

7. The system of claim 1, wherein the instructions include further instructions that, as a result of execution by the one or more processors, cause the system to further:
determine a third frame for of the first plurality of shots;
determine a variance of Laplacian (VOL) associated with the third frame is greater than a predetermined threshold; and
discard the third frame based on the determination that the VOL is greater than the predetermined threshold.

8. The system of claim 1, wherein:
the first group comprises one or more frames that are visually similar based on scenic similarity; and
a second group of frames comprises second one or more frames that are visually similar based on facial similarity.

9. A non-transitory computer-readable storage medium storing executable instructions that, as a result of being executed by one or more processors of a computer system, cause the computer system to at least:
determine a search query, the search query comprising one or more search parameters and indicating a multimedia content for performance of the search query;
determine a plurality of shots for the multimedia content, wherein a first shot of the plurality of shots comprises a first plurality of frames;
select, based on one or more quality metrics, a first frame from the first plurality of frames;
determine, using a first neural network, a first embedding vector for the first frame;
determine, using the first neural network, a second embedding vector for a second frame, wherein a second shot of the plurality of shots comprises the second frame of a second plurality of frames of the second shot;
determine, using a classification model and based on the first embedding vector and the second embedding vector, a first group of visually similar frames, wherein the first group comprises the first frame and the second frame;
determine, using a second neural network and based on textual information associated with the multimedia content, a first relevance score for the first group of visually similar frames; and
determine, based on the first relevance score, the first frame and the second frame as results of the search query.

10. The non-transitory computer-readable storage medium of claim 9, wherein the instructions, as a result of being executed by the one or more processors of the computer system, further cause the system to:
determine a third shot of the plurality of shots, wherein the third shot comprises a second plurality of frames;
select, based on the one or more quality metrics, a third frame from the second plurality of frames;
determine, using the first neural network, a third embedding vector for the third frame;
determine, using the classification model and based on the third embedding vector, a second group of visually similar frames, wherein the second group comprises the third frame, further wherein the second group is visually dissimilar to the first group;
determine, using the second neural network model and based on the textual information associated with the multimedia content, a second relevance score for the second group; and
generate a ranking based on the first relevance score and second relevance score.

11. The non-transitory computer-readable storage medium of claim 9, wherein the instructions to select the first frame from the plurality of frames based on the one or more quality metrics include instructions that, as a result of execution by the one or more processors of the computer system, further cause the system to:
compute a frame difference for the first frame and an adjacent frame to the first frame;
determine a region of the first frame based on detection of facial features in the first frame;
determine a first variance of Laplacian (VOL) for the region; and
determine the first VOL is less than a predetermined threshold.

12. The non-transitory computer-readable storage medium of claim 11, wherein the region comprises the first frame.

13. The non-transitory computer-readable storage medium of claim 9, wherein the instructions to determine, using the second neural network and based on the textual information associated with the multimedia content, the first relevance score for the first group of visually similar frames includes instructions that, as a result of execution by the one or more processors of the computer system, further cause the system to:
determine, using the second neural network, based on the first frame and the textual information associated with the multimedia content, a first sub-score;
determine, using the second neural network, based on the second frame and the textual information associated with the multimedia content, a second sub-score; and
determine the first relevance score based on the first sub-score and the second sub-score.

14. The non-transitory computer-readable storage medium of claim 9, wherein the classification model is a k-nearest neighbor (k-NN) classification model.

15. The non-transitory computer-readable storage medium of claim 9, wherein the instructions include further instructions that, as a result of execution by the one or more processors of the computer system, further cause the system to further:
determine a third frame for of the first plurality of shots;
determine a variance of Laplacian (VOL) associated with the third frame is greater than a predetermined threshold; and
discard the third frame based on the determination that the VOL is greater than the predetermined threshold.

16. The non-transitory computer-readable storage medium of claim 9, wherein:
- the first group comprises one or more frames that are visually similar based on scenic similarity; and
- a second group of frames comprises second one or more frames that are visually similar based on facial similarity.

* * * * *